United States Patent
Mao et al.

(10) Patent No.: US 7,736,209 B2
(45) Date of Patent: Jun. 15, 2010

(54) ENHANCED ELECTRON FIELD EMISSION FROM CARBON NANOTUBES WITHOUT ACTIVATION

(75) Inventors: Dongsheng Mao, Austin, TX (US); Richard Fink, Austin, TX (US); Zvi Yaniv, Austin, TX (US)

(73) Assignee: Applied Nanotech Holdings, Inc., Austin, TX (US)

( * ) Notice: Subject to any disclaimer, the term of this patent is extended or adjusted under 35 U.S.C. 154(b) by 1079 days.

(21) Appl. No.: 11/215,696

(22) Filed: Aug. 30, 2005

(65) Prior Publication Data

US 2007/0278925 A1    Dec. 6, 2007

Related U.S. Application Data

(60) Provisional application No. 60/609,128, filed on Sep. 10, 2004.

(51) Int. Cl.
*H01J 9/00* (2006.01)
(52) U.S. Cl. .......................................... 445/49
(58) Field of Classification Search ......... 313/495–497, 313/309, 336, 351, 310, 311; 445/23–25, 445/49–51
See application file for complete search history.

(56) References Cited

U.S. PATENT DOCUMENTS

| | | | |
|---|---|---|---|
| 5,236,382 A | 8/1993 | Oh | |
| 5,417,600 A | 5/1995 | Maegawa et al. | |
| 5,726,524 A | 3/1998 | Debe | |
| 5,828,162 A * | 10/1998 | Danroc et al. | 313/309 |
| 5,830,527 A | 11/1998 | Vickers | |
| 5,876,542 A | 3/1999 | Fujiwara | |
| 6,048,243 A | 4/2000 | Kosaka et al. | |
| 6,057,637 A | 5/2000 | Zettl et al. | |
| 6,239,547 B1 | 5/2001 | Uemura et al. | |
| 6,250,984 B1 | 6/2001 | Jin et al. | |

(Continued)

FOREIGN PATENT DOCUMENTS

EP     0989579 A2    3/2000

(Continued)

OTHER PUBLICATIONS

Chung, D.S., "Field Emission From 4.5 in. Single-Walled and Multiwalled Carbon Nanotube Films," J. Vac. Sci. Technol., Mar./Apr. 2000, pp. 1054-1058, 2000, American Vacuum Society.

(Continued)

*Primary Examiner*—Joseph L Williams
(74) *Attorney, Agent, or Firm*—Kelly Kordzik; Matheson Keys Garsson & Kordzik PLLC

(57) ABSTRACT

A method for forming cathodes for use in field emission devices using nanoparticles, such as carbon nanotubes (CNTs), is disclosed. The CNT layer comprises the electron emitting material on the surface of the cathode. Using the methods of the present invention, the density of the deposited CNTs may be modulated by forming emitter islands on the surface of the cathode. The size and distribution of the CNT emitter islands serve to optimize the field emission properties of the resulting CNT layer. In one embodiment, the CNT emitter islands are formed using a screen-printing deposition method. The present invention may be practiced without further process steps after deposition which activate or align the carbon nanotubes for field emission.

7 Claims, 8 Drawing Sheets

U.S. PATENT DOCUMENTS

| | | | |
|---|---|---|---|
| 6,270,571 | B1 | 8/2001 | Iwasaki et al. |
| 6,277,318 | B1 | 8/2001 | Bower et al. |
| 6,296,740 | B1 | 10/2001 | Xie et al. |
| 6,409,567 | B1 | 6/2002 | Amey et al. |
| 6,436,221 | B1 | 8/2002 | Chang et al. |
| 6,441,550 | B1 | 8/2002 | Patterson et al. |
| 6,538,367 | B1 | 3/2003 | Choi et al. |
| 6,553,096 | B1 | 4/2003 | Zhou et al. |
| RE38,223 | E | 8/2003 | Keesmann et al. |
| 6,616,495 | B1 | 9/2003 | Tsuboi |
| 6,630,023 | B2 | 10/2003 | Tolt et al. |
| 6,630,772 | B1 * | 10/2003 | Bower et al. ............... 313/311 |
| 6,645,402 | B1 | 11/2003 | Kurokawa et al. |
| 6,653,366 | B1 * | 11/2003 | Imai et al. ................... 523/160 |
| 6,713,947 | B2 | 3/2004 | Hirasawa et al. |
| 6,798,127 | B2 | 9/2004 | Mao et al. |
| 6,813,828 | B2 | 11/2004 | Dlugokecki et al. |
| 6,866,562 | B2 | 3/2005 | Girolamo |
| 6,890,230 | B2 | 5/2005 | Trujillo et al. |
| 6,911,767 | B2 | 6/2005 | Takai |
| 7,125,308 | B2 | 10/2006 | Fink |
| 2002/0094494 | A1 * | 7/2002 | Chung et al. ............... 430/311 |
| 2002/0104603 | A1 | 8/2002 | Chang et al. |
| 2002/0109086 | A1 | 8/2002 | Colbert et al. |
| 2003/0092207 | A1 | 5/2003 | Yaniv et al. |
| 2004/0109813 | A1 | 6/2004 | Hwang et al. |
| 2005/0067937 | A1 * | 3/2005 | Sheu et al. ................. 313/309 |
| 2006/0252163 | A1 | 11/2006 | Yaniv et al. |

FOREIGN PATENT DOCUMENTS

| | | |
|---|---|---|
| EP | 1 361 592 | 11/2003 |
| JP | 2000-36243 | 2/2000 |
| JP | 2000-260298 | 9/2000 |
| JP | 2003-166040 | 6/2003 |
| JP | 2005-05079 | 1/2005 |

OTHER PUBLICATIONS

Bonard, Jean-Marc, "Tuning the Field Emission Properties of Patterned Carbon Nanotube Films," Adv. Mater., Feb. 5, 2001, pp. 184-188, No. 3.

Vink, T.J., "Enhanced Field Emission From Printed Carbon Nanotubes by Mechanical Surface Modification," Applied Physics Letters, Oct. 27, 2003, pp. 3552-3554, vol. 83, No. 17, American Institute of Physics, 2003.

Kim, Yong C., "Vertical Alignment of Printed Carbon Nanotubes by Multiple Field Emission Cycles," Applied Physics Letters, Jun. 28, 2004, pp. 5350-5352, vol. 84, No. 26, American Institute of Physics, 2004.

Yang-Doo Lee et al., "53.2: Characteristics of Field Emission from Printed Carbon Nanotubes by Physical Surface Treatments," SID 05 Digest, 2005, pp. 1617-1619.

Jihua Zhang et al., "Enhancement of field emission from hydrogen plasma processed carbon nanotubes," Diamond and Related Materials, 13 (2004), pp. 54-59.

W.J. Zhao et al., "Field emission from screen-printed carbon nanotubes irradiated by tunable ultraviolet laser in different atmospheres," J. Vac. Sci. Technol. B, vol. 21, No. 4, Jul./Aug. 2003, pp. 1734-1737.

Z.F. Ren et al., "Synthesis of Large Arrays of Well-Aligned Carbon Nanotubes on Glass," Science, vol. 282, Nov. 6, 1998, pp. 1105-1107.

Won Seok Kim et al., "Secondary electron emission from magnesium oxide on multiwalled carbon nanotubes," Appl. Phys. Lett., vol. 81, No. 6, Aug. 5, 2002, pp. 1098-1100.

Walt A. de Heer, "Nanotubes and the Pursuit of Applications," MRS Bulletin, Apr. 2004, pp. 281-285.

D.S. Mao et al., New CNT composites for FEDs that do not require activation, 9th International Display Workshops, Dec. 2002, Hiroshima, Japan, pp. 1-2.

Zvi Yaniv, "The Status of the Carbon Electron Emitting films for Display and Microelectronic Applications," International Display Manufacturing Conference, Jan. 2002, Seoul, Korea, pp. 1-6.

S. Nakata et al., "Fabrication of CNT Electron Source by Simple Stacking for Obtaining Uniform Emission Distributions," SID 04 Digest, Society for Information Display 2004 International Symposium, Digest of Technical Papers, vol. XXXV, Book II, May 26-27, 2004, pp. 928-931.

Junto Yotani et al., "CNT-FED for Character Displays," SID 04 Digest, Society for Information Display 2004 International Symposium, Digest of Technical Papers, vol. XXXV, Book II, May 26-27, 2004, pp. 828-831.

Chih-Che Kuo et al., "Spray-Coating Process for Preparing CNT-FED Cathode," SID 04 Digest, Society for Information Display 2004 International Symposium, Digest of Technical Papers, Vol. XXXV, Book II, May 26-27, 2004, pp. 825-827.

C. G. Lee et al., "FEDs with CNT on Large Area Applications," IDW '02, Proceedings of the Ninth International Display Workshops, Dec. 4-6, 2002, pp. 1021-1024.

G. Z. Yue et al., "Generation of Continuous and Pulsed Diagnostic Imaging X-Ray Radiation Using a Carbon-Nanotube-Based Field-Emission Cathode," Applied Physics, vol. 81, No. 2, Jul. 8, 2002, pp. 355-357.

Chris Bower et al., "A Micromachined Vacuum Triode Using a Carbon Nanotube Cold Cathode," IEEE Transactions on Electron Devices, vol. 49, No. 8, Aug. 2002, pp. 1478-1483.

W. Rochanachirapar et al., "Effect of Laser Irradiation on CNT-Cathodes in Different Atmospheres," IDW '03, Proceedings of the 10th International Display Workshops, Dec. 3-5, 2003, pp. 1207-1210.

Yasunori Kanazawa et al., "Improvement in Electron Emission from Carbon Nanotube Cathodes after Ar Plasma Treatment," J. Vac. Sci. Technol. B, 22(3), May/Jun. 2004, pp. 1342-1344.

Kwang-Bok Kim et al., "Efficient Electron Emissions from Printed Carbon Nanotubes by Surface Treatments," J. Vac. Sci. Technol. B, 22(3), May/Jun. 2004, pp. 1331-1334.

Jong Min Kim et al., "Field Emission from Carbon Nanotubes for Displays," Diamond and Related Materials 9, (2000), pp. 1184-1189.

* cited by examiner

ENHANCED ELECTRON FIELD EMISSION FROM CARBON NANOTUBES WITHOUT ACTIVATION

The present invention claims priority under 35 U.S.C. §119 (e) to U.S. Provisional Patent Application Ser. No. 60/609, 128.

TECHNICAL FIELD

The present invention relates in general to field emission, and in particular to field emission using carbon nanotube cathodes.

BACKGROUND INFORMATION

Carbon nanotubes (CNTs) are excellent cold cathode materials for field emission applications such as flat panel displays, microwave sources, x-ray tubes, etc. for very stable and low voltage operation with long lifetime because of their high aspect ratio, electrical conductivity, and outstanding chemical inertness (Zvi Yaniv, "The status of the carbon electron emitting films for display and microelectronic applications," The International Display Manufacturing Conference, Jan. 29-31, 2002, Seoul, Korea). CNTs can be grown on catalyst-supported substrates by arc discharge, laser ablation and other techniques at high temperatures up to 1200-1300° C. Aligned CNTs, deposited by chemical vapor deposition (CVD), may have good field emission properties because they have higher geometric field enhancement. But the CVD process is not necessarily suited for depositing CNTs over large areas because it is very difficult to achieve high uniformity of process conditions across large substrate areas as required for display applications. CVD growth of CNTs also requires a high process temperature (over 500° C.), eliminating the use of low-cost substrates such as soda-lime glass.

A simpler process is to collect the CNT powders and deposit them uniformly onto a selective area of the substrate. CNTs can be printed through a mesh screen if they are mixed with a binder, epoxy, etc. (D. S. Chung, W. B. Choi, J. H. Kang et al., "Field emission from 4.5 in. single-walled and multi-walled carbon nanotube films," J. Vac. Sci. Technol. B18(2), 1054-1058 (2000)). They can be sprayed onto the substrates if mixed with a solvent such as IPA, acetone, or water (D. S. Mao, R. L. Fink, G. Monty et al., "New CNT composites for FEDs that do not require activation," Proceedings of the Ninth International Display Workshops, Hiroshima, Japan, p. 1415, Dec. 4-6, 2002). Special surface treatments, so called "activation" processes, are then often needed to achieve low electric field emission and high emission site density of the CNT cathodes. A taping process can enhance the field emission properties of the carbon nanotubes (Yu-Yang Chang, Jyh-Rong Sheu, Cheng-Chung Lee, "Method of improving field emission efficiency for fabricating carbon nanotube field emitters," U.S. Pat. No. 6,436,221). In this method, an adhesive tape is closely attached on the CNT cathode surface and then it is removed. As a result of taping, some carbon nanotubes will be vertically oriented, and the poorly bonded CNT portions will be removed. Possibly some adhesive residue will remain behind on the top of the carbon nanotube layer. The organic residue on the cathode surface after the taping activation process may emit residual, undesirable gases in the sealed glass display envelope during field emission operation. Also, uniformly activating the substrate over a large area remains difficult. For example, many display applications may require 40 inch-100 inch diagonal plates.

Although a portion of the CNTs may vertically align after the taping process, which has been considered a key factor in improving the field emission properties of the CNT cathodes, in fact some CNT material is removed by the adhesive layer of the tape. Researchers have found that the field emission properties of the CNTs are diminished if the CNTs are very dense (Jean-Marc Bonard, Nicolas Weiss, Hannes Kind et al., "Tuning the field emission properties of patterned carbon nanotube films," Advanced Materials 13, 184-188 (2001)). An electric field shielding effect occurs when the CNTs are very close to each other, preventing CNTs from emitting electrons. Enhanced field emission properties of CNTs mixed with particles have been obtained because the CNTs were separated with each other by the particles (Dongsheng Mao, Richard Lee Fink, Zvi Yaniv, "Enhanced field emission from carbon nanotubes mixed with particles," U.S. Pat. No. 6,798,127). In that patent, researchers obtained good field emission results without an activation process, such as taping, after the deposition of the CNT mixture. In earlier studies using carbon film as a cold cathode, a patterned carbon film was observed having much better field emission properties than a continuous carbon film (Zhidan Li Tolt, Zvi Yaniv, Richard Lee Fink, "Surface treatment process used in growing a carbon film," U.S. Pat. No. 6,630,023). Another activation process involves using an optimized soft rubber roller to remove the contaminants covering the CNTs (Yong C. Kim, K. H. Sohn, Y. Mo. Cho, and Eun H. Yoo, "Vertical alignment of printed carbon nanotubes by multiple field emission cycles," Appl. Phys. Lett 84, 5350-5352 (2004)). During that process, a portion of the CNT was also removed, and the field emission properties of the CNTs were improved. Alignment of CNTs after the rubbing process was not observed, but alignment was observed after an electric field was applied to the CNT coating. This indicates that the alignment of the CNTs on the cathode is not a required material property for improved field emission characteristics.

In view of these findings in the related art, there is a need for a low-temperature method to produce a CNT cathode layer such that the CNTs are not too densely deposited on the surface, thereby inhibiting electron emission. With an optimized spatial distribution of the CNT material, the post-deposition activation process may be eliminated, thereby saving significant cost and effort in the manufacture of the resulting field emission display apparatus.

SUMMARY OF THE INVENTION

The present invention addresses the foregoing need by providing a method that results in a CNT cathode with improved field emission characteristics without requiring an activation process step. The CNT material is deposited on the cathode electrode surface as a layer of distinct emitter islands which are physically separated from each other. Optimization of the electron field emission performance is realized by modulating the density of the field emitter islands. A method of the present invention requires neither mixing of the CNT material with other particles nor physical alignment of the CNTs to obtain enhanced field emission properties.

Merits of the present invention over the prior art for depositing CNT material for field emission cathodes include an optimization of the amount of CNTs required and an overall simpler process as compared to deposition with subsequent activation and material removal. Using a low-temperature deposition process, such as screen-printing, the present invention provides a method that is cost-effective for industrial scale operations.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, the advantages thereof, reference is now made to the following descriptions taken in conjunction with the accompanying drawings, in which.

DETAILED DESCRIPTION

Figure 1:
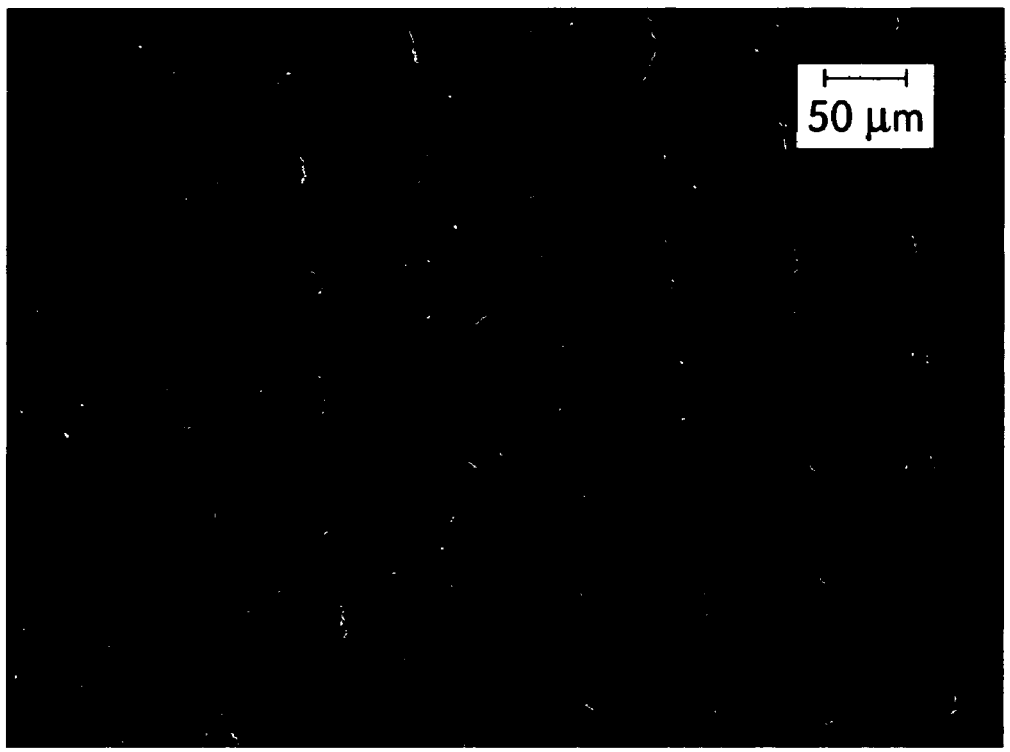
FIG. 1 shows an optical image of a mesh screen.

In the following description, numerous specific details are set forth such as specific substrate materials to provide a thorough understanding of the present invention. However, it will be obvious to those skilled in the art that the present invention may be practiced without such specific details. In other instances, well known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

The present invention provides substantially enhanced field emission properties by patterning CNT islands that are separated from each other. The method and devices of the present invention do not require an activation process to facilitate field emission of the CNT cathode material. The present invention thus incorporates a very easy and low cost process, which can be performed over a very large area with very good uniformity.

Unpurified (from Iljin Nanotech, Inc., Korea) and purified (from Carbon Nanotechnologies, Inc., Houston, Tex.) single-wall carbon nanotubes (SWNTs) used in one example of the present invention were 1-2 nm in diameter and 5-20 μm in length. Both purified and unpurified single-wall, double-wall or multi-wall carbon nanotubes, carbon fibers or other kinds of nanotubes and nanowires from other sources can also be used with similar results. The CNT material may also be comprised of chemically modified CNTs, functionalized CNTs, or CNTs derivatized by various methods. The CNT material may also comprise various other forms of nanoparticles, including buckytubes, carbon fibrils, metallic carbon nanotubes, semiconducting carbon nanotubes. In some cases, the nanoparticle material may comprise spherical particles, dish-shaped particles, lamellar particles, rod-like particles, metal particles, semiconductor particles, polymeric particles, ceramic particles, dielectric particles, clay particles, and fibers. In other example methods, various combinations in composition and form of aforementioned nanoparticles may also be used to practice the current invention.

In an illustrative example of the present invention, the CNT islands were formed using a screen-printing process. In one method, the paste containing CNTs was made by a grinding process. The CNT paste was made by mixing 1.3 g CNT powder with 8 g vehicle (organic solvent, made by Daejoo Fine Chemical Co., Korea), 0.7 g low melting point (430° C.) glass frit (binder, made by Daejoo Fine Chemical Co., Korea), and thinner (organic solvent, Dupont) to further adjust the viscosity of the paste. A 3 roll mill (Netzsch Inc.) was used to grind the paste at least 20 times to disperse the CNTs in the paste. In one mixture, the final viscosity of the paste was about 130,000 CP.

The CNT paste was then deposited by a screen-printing process. A 355-mesh screen was used to print the CNT paste with a controlled thickness onto the substrate. FIG. 1 shows the optical microscope image of the mesh screen. The screen was formed with patterned polyester lines with 10 micron emulsion on them to control the thickness of the CNT paste. The width of the polyester lines is about 42 microns. The size of the opening where the CNT paste will pass through to the substrate is 28 micron×28 micron. It can be seen that some CNT materials were left in the openings after the printing process. In other cases, various comparable size mesh screens may also be used to practice the invention. In other examples of the present invention, processes other than the screen-printing process such as spraying, brushing, ink-jet printing, electrophoresis deposition, and dispersing may also be utilized.

Figure 2:
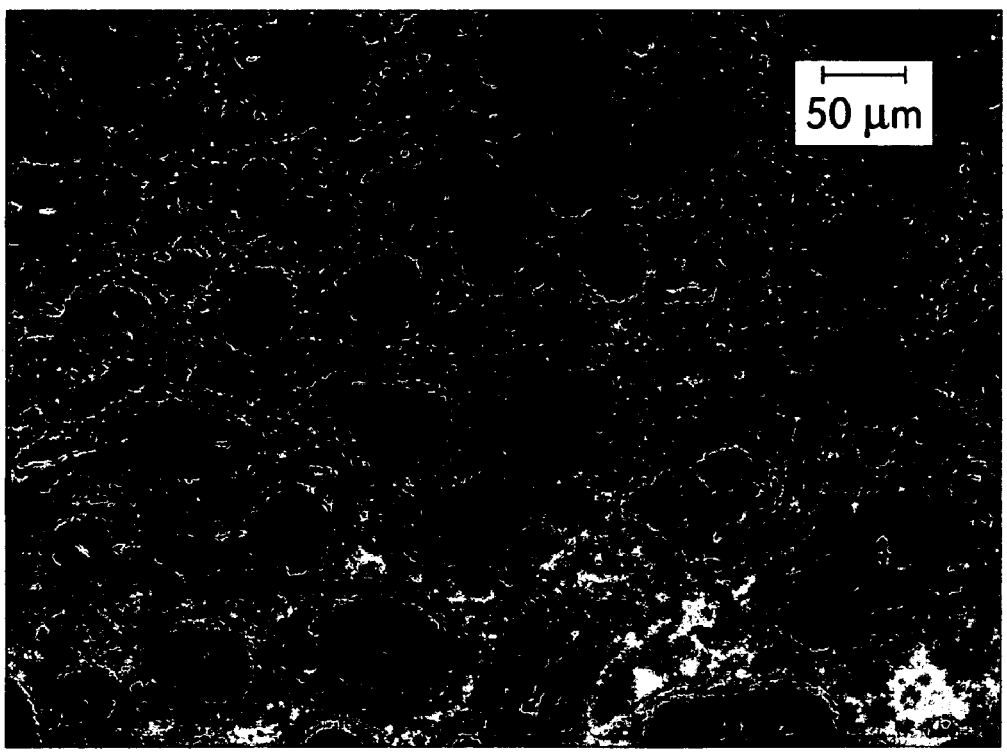
FIG. 2 shows an optical microscope image of the CNT coating on the substrate.
Figure 3:
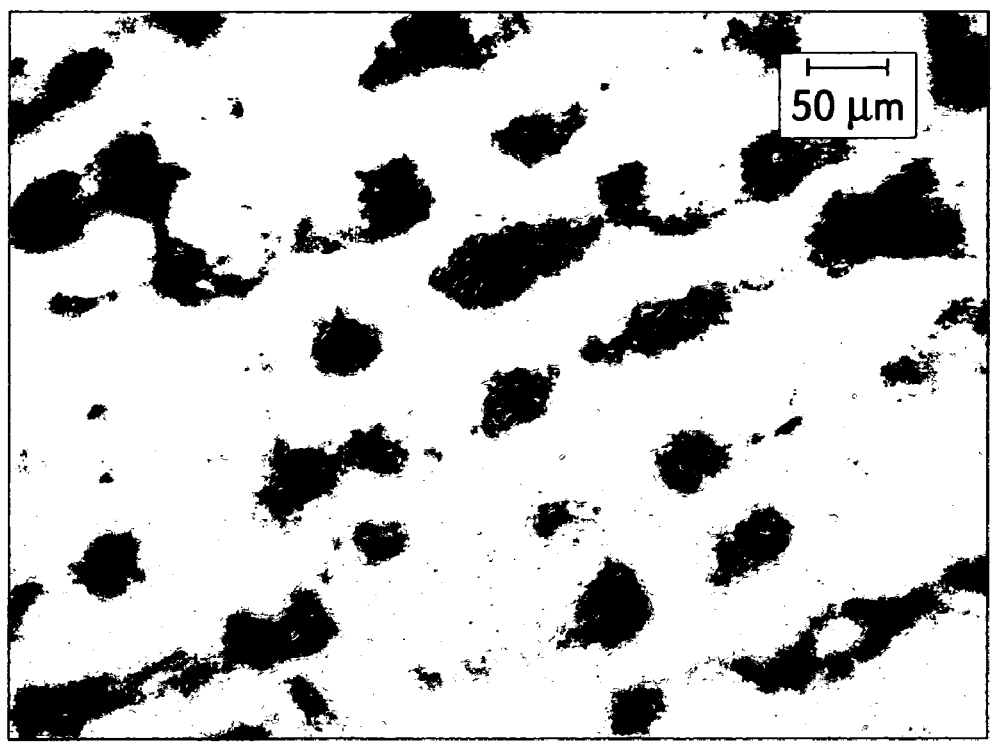
FIG. 3 shows an optical image of a sample after a firing process.

A manual squeegee was used to print the CNT paste on the ITO/glass surface over an area of 3 cm×3 cm. The sample was then baked at 100° C. for 10 min. in an oven to harden the top surface of the CNT coating immediately after printing. FIG. 2 shows an optical microscope image of the CNT coating after baking. CNT islands can clearly be seen in the image. The sample was then fired in a vacuum oven. In one firing process, the temperature was increased with a rate of 180° C. per hour. The temperature was then maintained at 315° C., for 10 min. to evaporate the organic material in the CNT coating mixture. Then, the oven was flooded with $N_2$ gas to prevent the CNTs from becoming graphitized, while the temperature was further increased to 450° C. for 10 min. to melt the glass frit. In one embodiment, the melted glass frit improved the adhesion between the conducting layer and the CNT coating. The sample was then cooled down to room temperature. FIG. 3 shows the optical microscope image of the sample after the firing process. In this example, the thickness of these CNT islands was around 2-4 microns.

Figure 4:
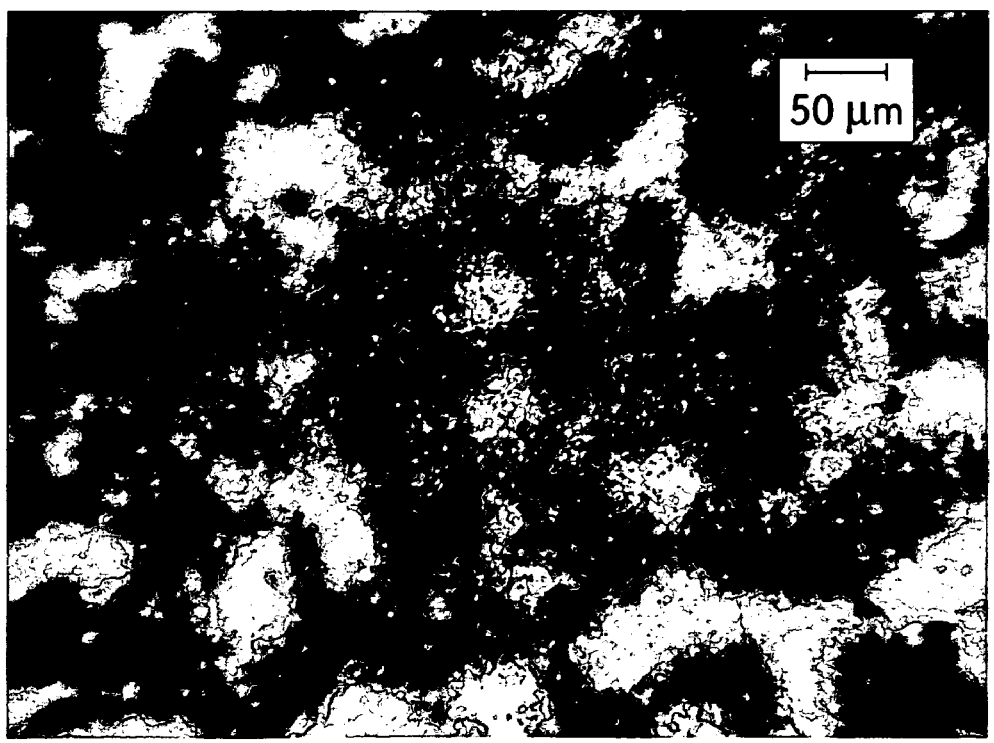
FIG. 4 shows an optical microscope image of a sample printed 5 times.

For comparison of the field emission properties, samples were printed 2, 3, and 5 times. With an increasing number of printed layers, the CNT islands became larger and more dense. Each time the samples were printed, they were baked at 100° C. for 10 min. before they were printed again. FIG. 4 shows an optical microscope image of a sample printed 5 times. Clearly visible in FIG. 4 are some CNT clusters that have connected with each other.

Figure 5:
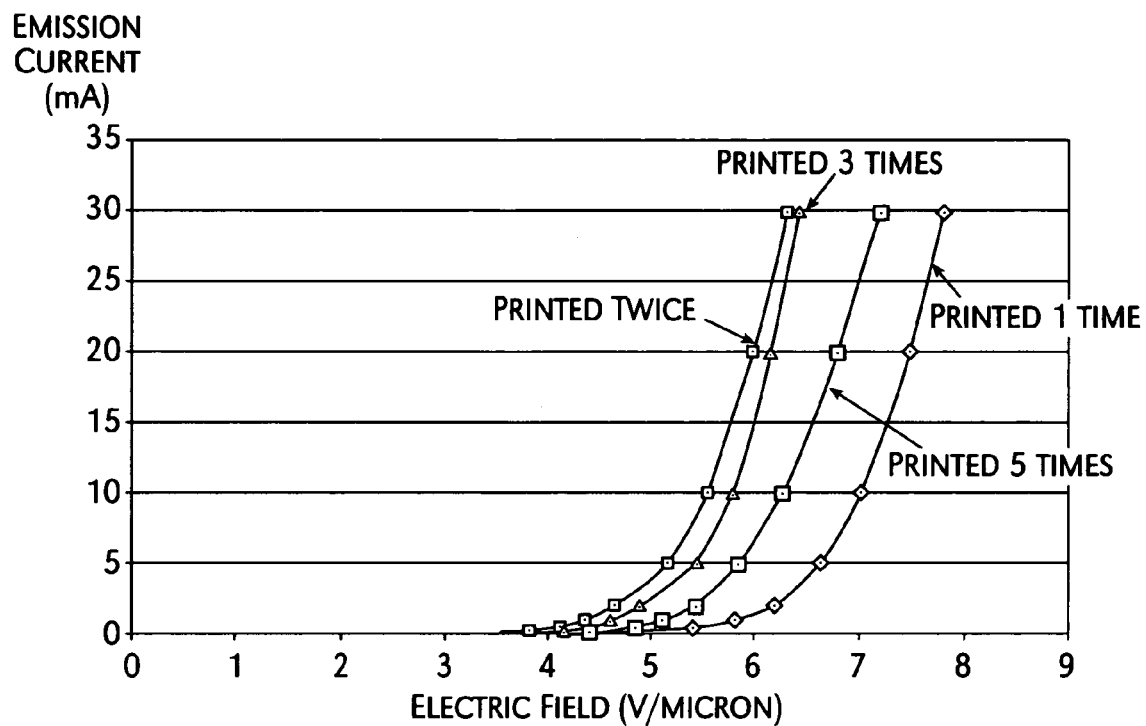
FIG. 5 illustrates field emission current vs. electric field data of several samples.
Figure 11:
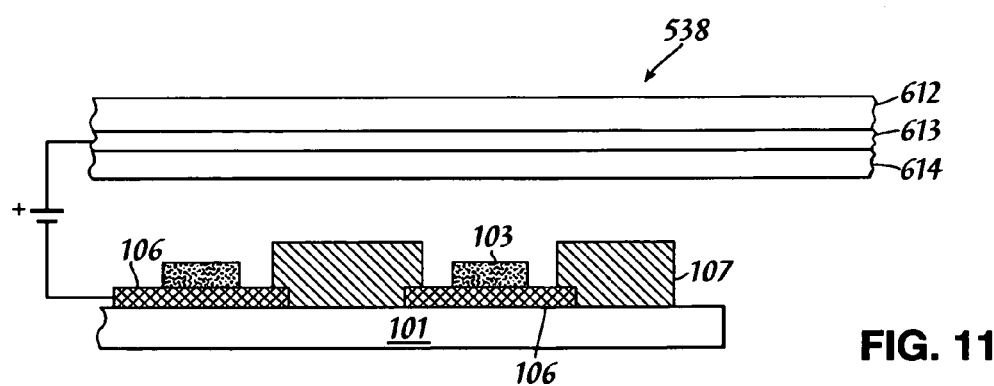
FIG. 11 illustrates a portion of a field emission display made using a cathode in a diode configuration.

To compare field emission properties, all the samples (printed once, twice, 3, and 5 times) were tested by mounting them with a phosphor screen in a diode configuration, as shown in FIG. 11, with a gap of about 0.5 mm between the anode and cathode. The test assembly was placed in a vacuum chamber and pumped down to $10^{-7}$ Torr pressure. The electrical properties of the cathode are then measured by applying a negative, pulsed voltage (AC) to the cathode and holding the anode at ground potential, while measuring the current at the anode. A DC potential could also be used for the testing. A graph of the emission current vs. electric field for the samples is shown in FIG. 5.

Figure 6:
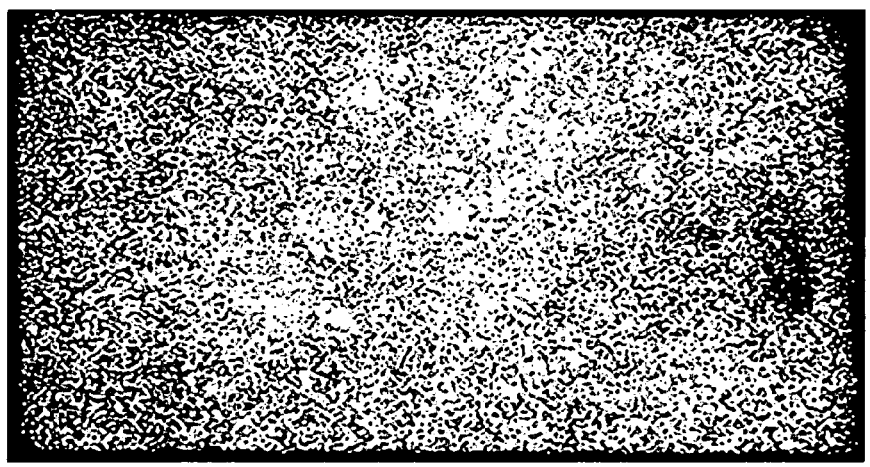
FIG. 6 shows a field emission image of a sample printed twice at an emission current of 30 mA.

The sample printed twice exhibited the best field emission properties, i.e., emission at lowest electric field strength. A field emission image of the sample printed twice is shown in FIG. 6, which shows very good uniformity and high emission site density. The electric field at an emission current of 30 mA was 7.82, 6.34, 6.44, and 7.2 V/micron respectively. The data indicate that an optimal CNT island density corresponded to printing the CNT paste twice in this example. For the samples that were printed 3 and more times, the field emission properties degraded with increasing density of the CNT islands. This is indicative of an electric field shielding effect, which is detrimental to the field emission behavior in those samples. In other embodiments of the present invention, the printing process may be modified to produce an optimal CNT island size and density, corresponding to the best field emission results, with a single printing operation.

Figure 7:
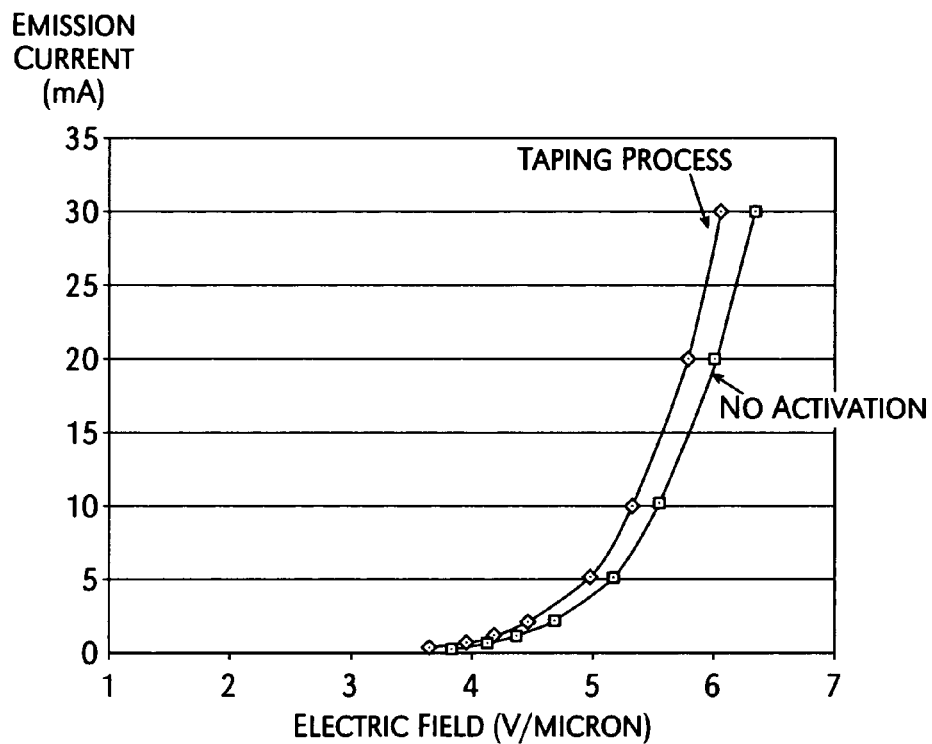
FIG. 7 illustrates field emission current vs. electric field data of samples of the present invention.

For further comparison, a taping process was performed to activate the CNTs after the firing process (Yang Chang, Jyh-Rong Sheu, Cheng-Chung Lee, Industrial Technology Research Institute, Hsinchu, TW, "Method of Improving Field Emission Efficiency for Fabrication Carbon Nanotube Field Emitters," U.S. Pat. No. 6,436,221). Clear tape (#336, 3M) was used to active the CNTs. The sample printed twice was chosen for the experiment, since this was the sample which exhibited the best field emission behavior. The tape was laminated on the CNT coating using the same process as described in U.S. Pat. No. 6,436,221. Then, the tape was peeled away. FIG. 7 shows the field emission current vs. electric field curves of the samples before and after taping. The data indicate that there is little difference in the field emission properties between the taped and untaped samples.

Figure 8:
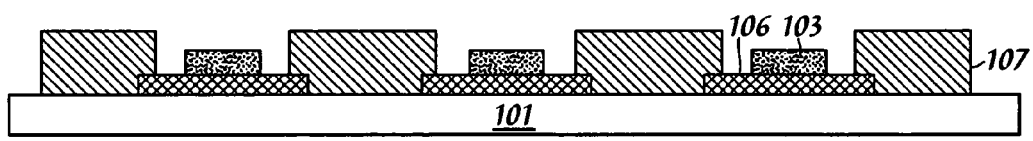
FIG. 8 illustrates a schematic diagram of the structure of the substrate.

In another illustrative example of the present invention, CNT paste was printed on a larger area with a patterned structure, as opposed to the previous samples which were formed on a blanket layer of ITO deposited on a glass substrate. For a CNT cold cathode device, a triode structure may be used in order to lower the extraction voltage and substantially lower the cost. For this example, a purified SWNT form of CNTs (Carbon Nanotechnologies, Inc.) was used. Referring to FIG. 8, CNT paste 103 was printed onto the surface of a patterned structure 101, 106, 107. First, 6 micron-thick silver paste electrodes 106 were screen-printed on a glass substrate 101. Then a 50 micron-thick insulating overcoat 107 was printed, thus leaving small openings in the silver electrode 106 on the surface. The size of the openings was 300 microns×800 microns in one case, while the number of the openings was 160×480 pixels. The total cathode active area was 10 inch by 10 inch.

Figure 6A:
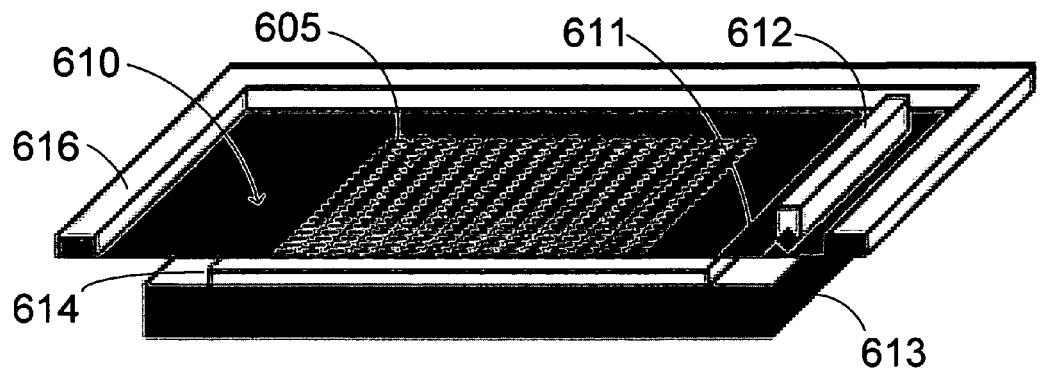
FIGS. 6A-6F illustrate a screen-printing process in an embodiment of the present invention.
Figure 6B:
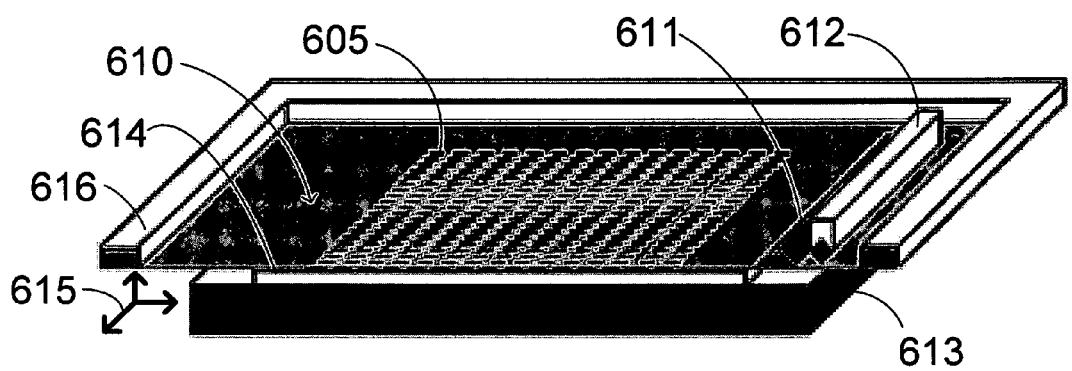
Figure 6C:
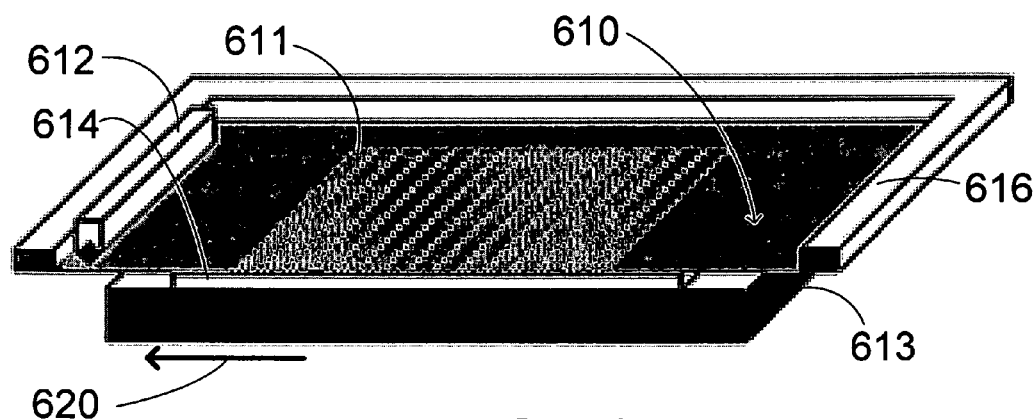
Figure 6D:
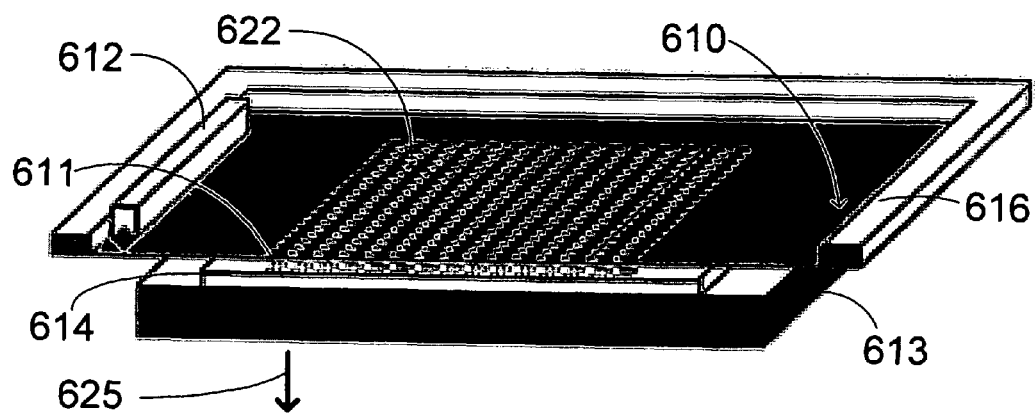
Figure 6E:
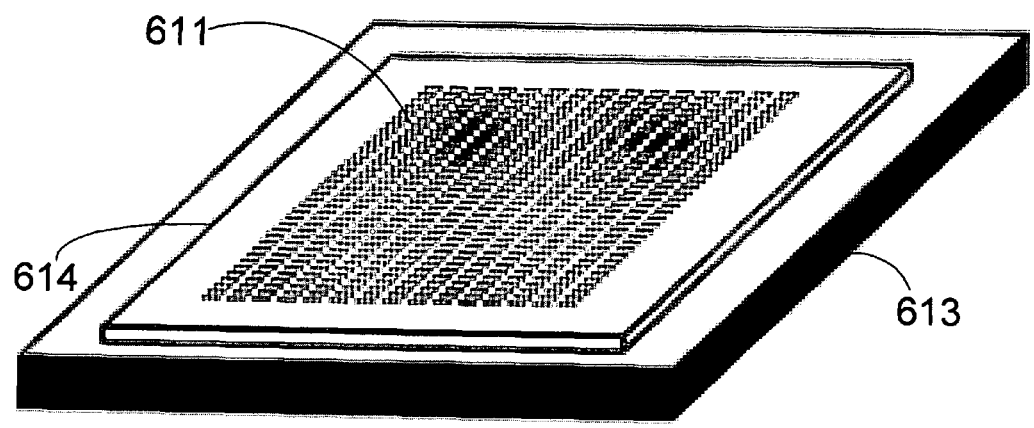
Figure 6F:
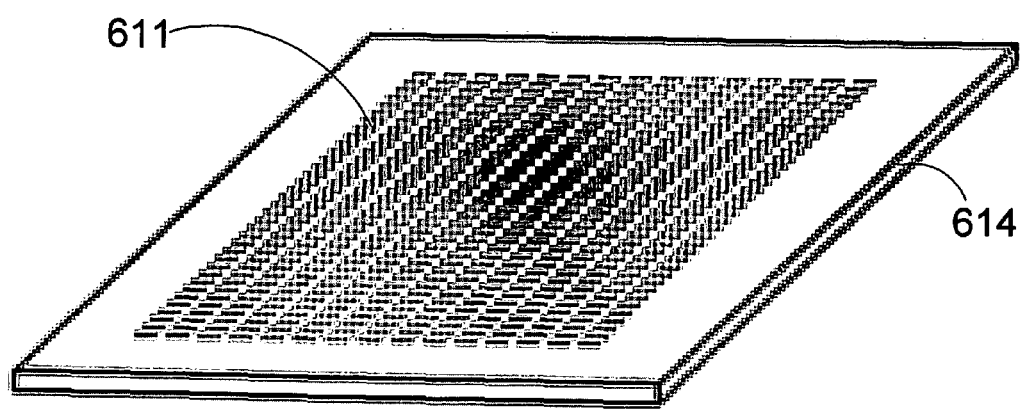

The CNT paste was printed into the wells through a patterned 355-mesh screen (see FIG. 1). The steps of a screen-printing process in one embodiment of the present invention are illustrated in FIGS. 6A-6F. Referring to FIG. 6A, which illustrates a cross-sectional diagram of the screen printing apparatus, a stage (or chuck) 613 receives the substrate 614 to be printed with the paste (or ink) 611. The paste 611 is deposited on one side of the printing surface 610 of an image mesh screen 616. A squeegee 612 is the means for evenly applying the paste 611 over the openings 605 in the mesh screen 616. Referring to FIG. 6B, the stage 613 along with the substrate 614 is aligned to the screen, such that a desired snap off distance between the screen 616 and the substrate 614 is achieved. The alignment is made via manipulation of the stage 613 and substrate 614 in the x,y,z directions 615, whereby additional angular corrections or alignments may also be performed. In FIG. 6C, the movement of the squeegee 612 across the surface 610 of the mesh screen 616 in the direction 620 is performed, which effectively distributes the paste 611 evenly over the screen surface 610. The paste 611 is forced through the mesh openings 605 by the force of the squeegee 612. In FIG. 6D, the stage 613 and substrate 614, now printed with the paste 611, is lowered 625 away from the mesh screen 616. FIG. 6E illustrates the resulting stage 613 and substrate 614 printed with paste 611. In FIG. 6F, the stage 613 is removed, leaving the desired product, substrate 614 printed with paste 611 according to the pattern of the mesh screen 616.

Figure 9:
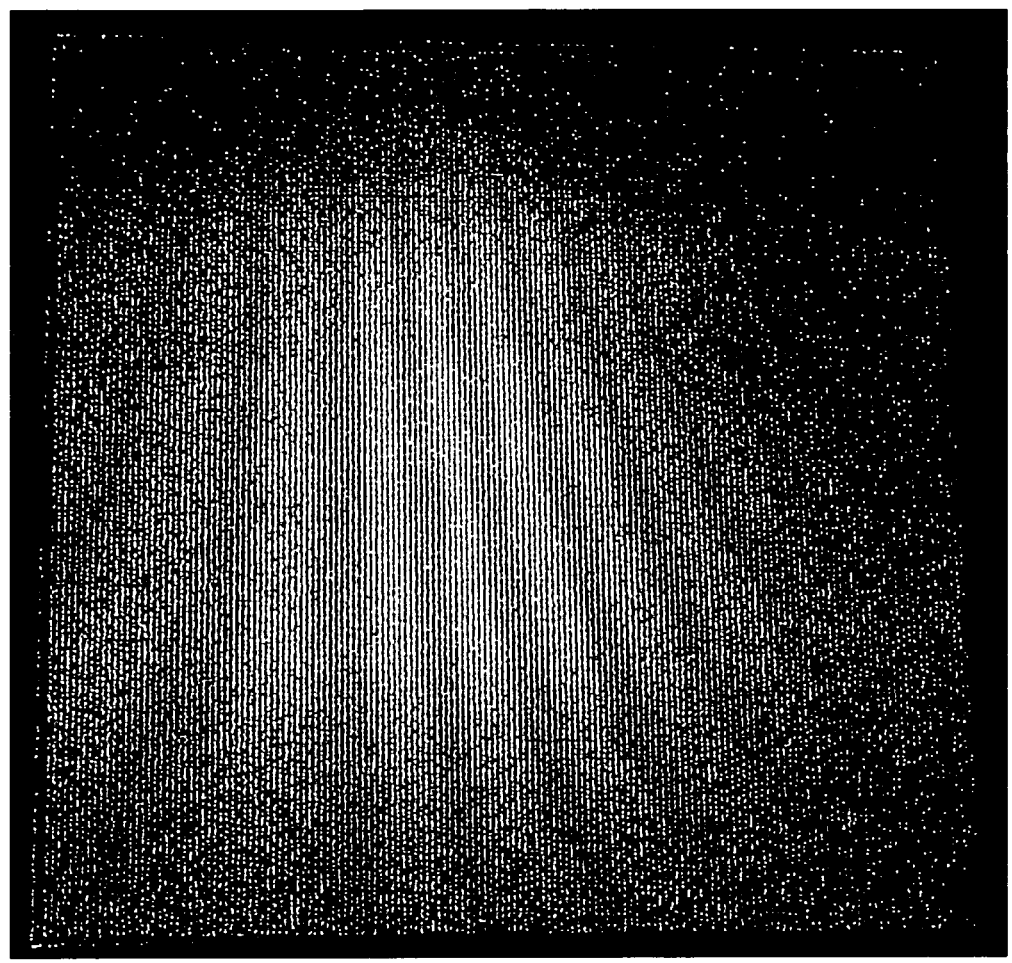
FIG. 9 shows a field emission image sample of an embodiment of the present invention.

The insulating overcoat 107 was 30-40 microns higher than the CNT coating 103. The sample was then baked and fired according to the procedure presented in the preceding examples. The field emission properties were then tested as previously mentioned. FIG. 9 shows a field emission image of a sample obtained by testing in a diode mode at an emission current of 120 mA. The image shows that the field emission was uniform over the large area. The dark area on the edges was a result of a warped anode screen, which created a non-uniform gap between the cathode and the anode.

Figure 10:
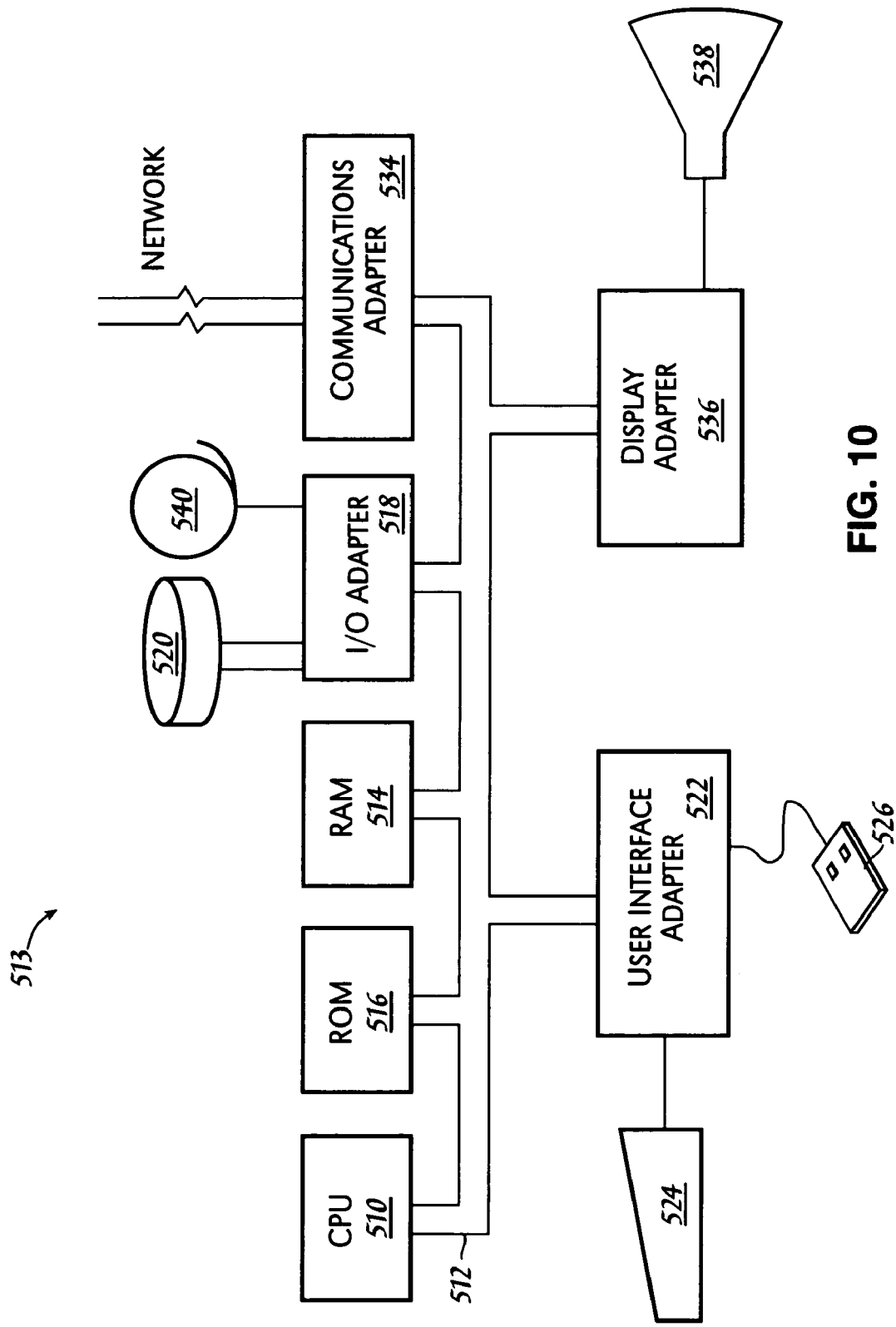
FIG. 10 illustrates a data processing system.

A representative hardware environment for practicing the present invention is depicted in FIG. 10, which illustrates an exemplary hardware configuration of data processing system 513 in accordance with the subject invention having central processing unit (CPU) 510, such as a conventional microprocessor, and a number of other units interconnected via system bus 512. Data processing system 513 includes random access memory (RAM) 514, read only memory (ROM) 516, and input/output (I/O) adapter 518 for connecting peripheral devices such as disk units 520 and tape drives 540 to bus 512, user interface adapter 522 for connecting keyboard 524, mouse 526, and/or other user interface devices such as a touch screen device (not shown) to bus 512, communication adapter 534 for connecting data processing system 513 to a data processing network, and display adapter 536 for connecting bus 512 to display device 538. CPU 510 may include other circuitry not shown herein, which will include circuitry commonly found within a microprocessor, e.g., execution unit, bus interface unit, arithmetic logic unit, etc. Display device 538 represents possible embodiments of the present invention.

FIG. 11 illustrates a portion of a field emission display 538 made using a cathode in a diode configuration, such as created above. Included with the cathode is a conductive layer 106 and the CNT emitter 103. The anode may be comprised of a glass substrate 612, and indium tin layer 613, and a cathodoluminescent layer 614. An electrical field is set up between the anode and the cathode. Such a display 538 could be utilized within a data processing system 513, such as illustrated with respect to FIG. 10.

Although the present invention and its advantages have been described in detail, it should be understood that various changes, substitutions and alterations can be made herein without departing from the spirit and scope of the invention as defined by the appended claims.

What is claimed is:

1. A method for forming a field emission cathode device comprising the step of depositing a surface layer of nanoparticles-material on a substrate such that said surface layer of nanoparticles-material forms a plurality of field emitting islands that are physically isolated from each other, wherein the nanoparticle-material is deposited using a 355-mesh screen having a mesh opening of about 25-30 microns wide.

2. The method of claim 1, wherein said field emitting islands of nanoparticle-material:
   are greater than about 10 nm wide;
   have more than about 10 nm distance between each other; and
   are greater than about 1 nm thick.

3. The method of claim 1, wherein said substrate comprises a conducting electrode layer.

4. The method of claim 1, wherein said nanoparticles-material layer is deposited by methods chosen from the group consisting of: screen-printing, brushing, spraying, dispersing, ink-jet printing, nano-imprinting, dip-pen lithography, x-ray lithography, optical lithography, and any combination thereof.

5. The method of claim 1, wherein the nanoparticles-material contains carbon nanotubes selected from the group consisting of: single-wall carbon nanotubes, double-wall carbon nanotubes, multiwall carbon nanotubes, buckytubes, carbon fibrils, chemically-modified carbon nanotubes, derivatized carbon nanotubes, metallic carbon nanotubes, semiconducting carbon nanotubes, and any combination thereof.

6. The method of claim 1, wherein the nanoparticle-material contains particles selected from the group consisting of: spherical particles, dish-shaped particles, lamellar particles, rod-like particles, metal particles, semiconductor particles, polymeric particles, ceramic particles, dielectric particles, clay particles, fibers, and any combination thereof.

7. The method of claim 1, wherein the nanoparticles-material is screen-printed on the substrate to thereby form the plurality of field emitting islands of the nanoparticles-material that are physically isolated from each other.

* * * * *